UNITED STATES PATENT OFFICE.

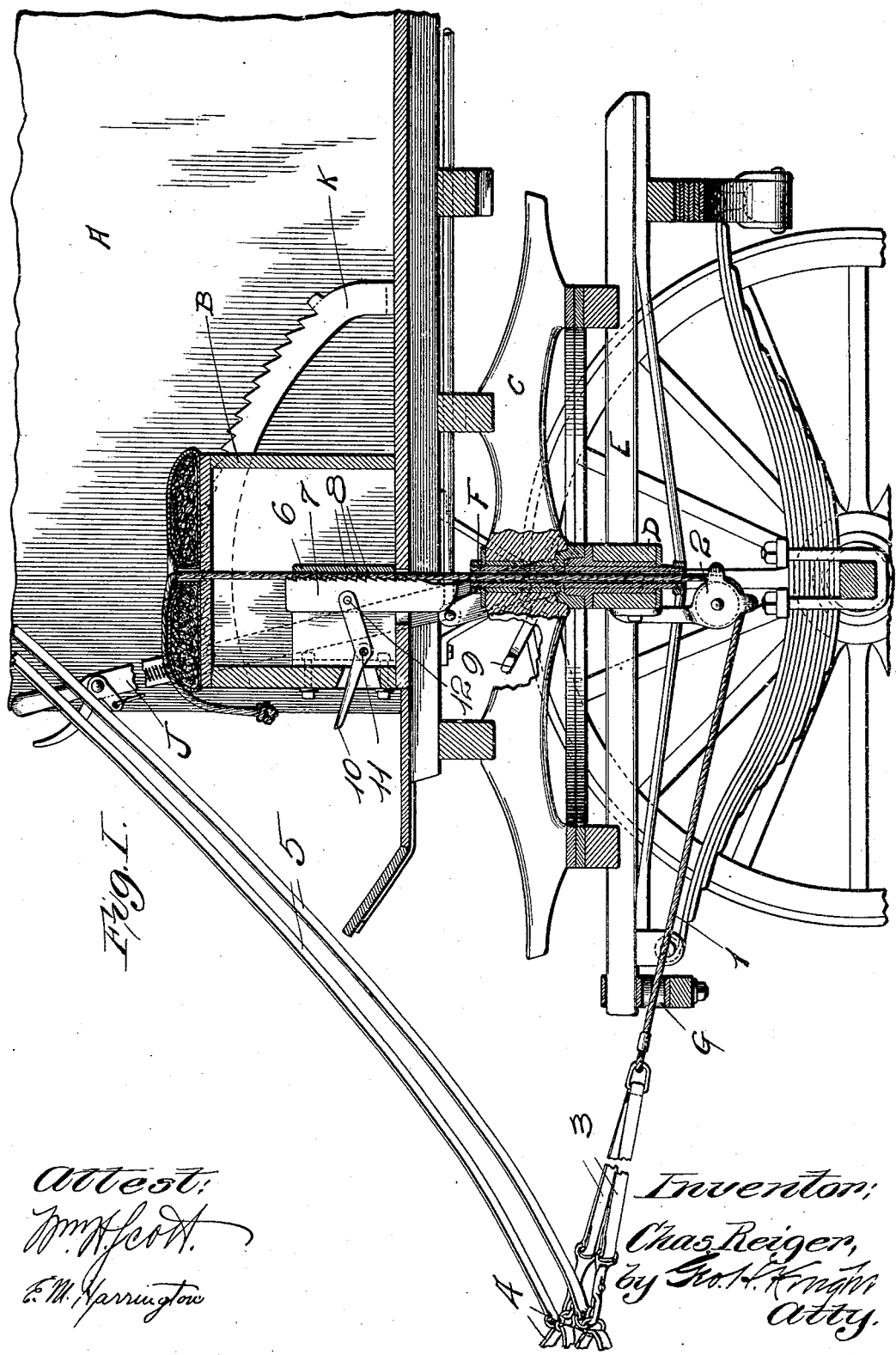

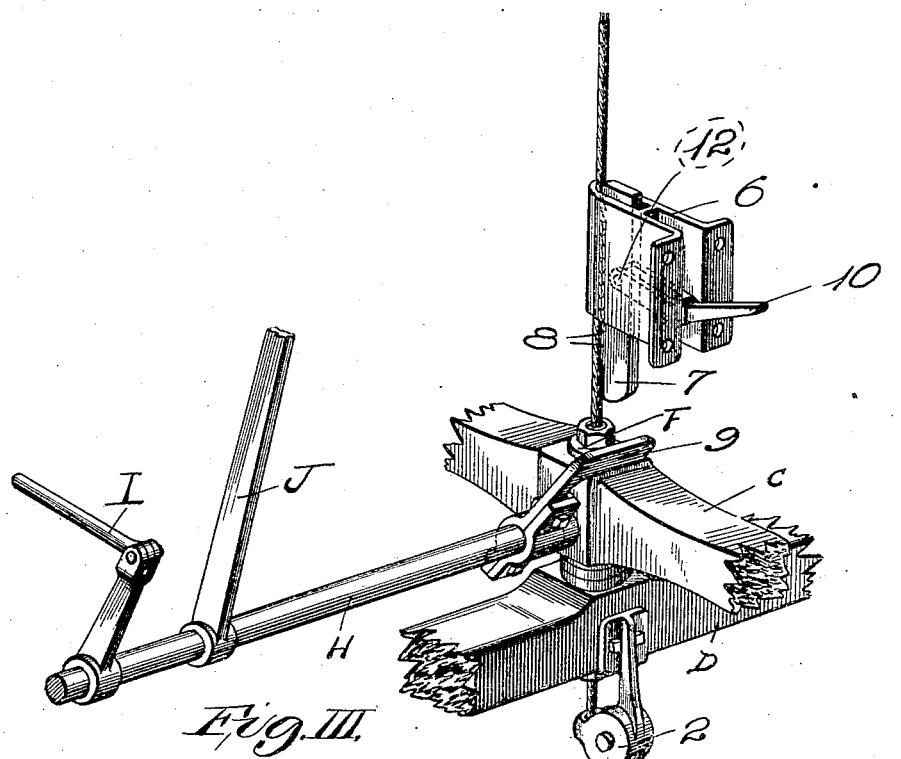

CHARLES REIGER, OF ST. LOUIS, MISSOURI, ASSIGNOR TO ADOLPH BOETTLER AND HENRY F. W. RUHE, OF ST. LOUIS, MISSOURI.

VEHICLE ATTACHMENT FOR DETAINING DRAFT-ANIMALS.

943,100.  Specification of Letters Patent.  Patented Dec. 14, 1909.

Application filed November 5, 1908.  Serial No. 461,169.

*To all whom it may concern:*

Be it known that I, CHARLES REIGER, a citizen of the United States of America, residing at the city of St. Louis, in the State of Missouri, have invented certain new and useful Improvements in Vehicle Attachments for Detaining Draft-Animals, of which the following is a full, clear, and exact description, reference being had to the accompanying drawings, forming part of this specification.

My invention relates to a device for use in vehicles by which draft animals may be held in check while attached to the vehicles without the necessity of hitching them to a stationary object to hold them when they are to remain at rest.

Figure I is a vertical longitudinal section taken through the forward portion of a vehicle with my animal detaining device illustrated in elevation and applied to the vehicle. Fig. II is a perspective view of my device. Fig. III is an enlarged vertical section taken through the gripping and releasing members of my device. Fig. IV is an enlarged horizontal section taken on irregular line IV—IV, Fig. III.

In the accompanying drawings: A designates the body of a vehicle provided with a seat B and beneath which is a fifth wheel having a bolster or top piece C that is supported by the bolster or cross piece D of hounds E. The bolsters C and D are connected by a hollow king-bolt F in which a member of my device to be hereinafter more particularly referred to, is adapted to operate. The vehicle shown in the drawings is intended to be drawn by two draft animals and the hounds present in the vehicle are adapted to receive a draft tongue but it is obvious that shafts might be connected to the vehicle instead of the draft tongue in order that the vehicle may be drawn by a single draft animal. The hounds E support at their forward ends and in a central position relative to the width of the hounds a guide G to which more particular reference will be hereinafter made. H, see Figs. II and III, is a brake operating shaft that extends transversely of the vehicle above the bolster of the hounds E and has attached to it a connecting rod I that leads to the brake beam of the vehicle (not shown). The brake shaft extends inwardly to one side of the fifth wheel bolster C and has fixed to it a hand lever J that is provided with a suitable latch (not shown) adapted to engage a rack K.

The draft animals, when attached to the vehicle, are controlled by my detaining device irrespective of the method by which they are attached to the vehicle and it is only necessary, in so far as the attachments of the animals are concerned, that slack exists in the attaching members, for instance, the harness traces, at the time that my attachment is placed in service for detaining the animals. The attachment is adapted to operate to detain said animals by reason of providing a connection between the vehicle and the bridle bits of the harnesses upon the animals in such manner as to occasion a pull upon the bridle bits in the event of the animals attempting to move forwardly when the attachment is in service.

1 designates a flexible detention member preferably in the nature of a rope, as illustrated in the drawings. This detention member passes loosely through the hollow king-bolt F of a vehicle and its rear end preferably extends through the top of the seat in the vehicle as seen in Fig. I. The detention member passes from the lower end of the king-bolt beneath a sheave 2 and then forwardly through the guide G supported by the hounds E. The detention member is connected at its forward end by suitable means, such as straps 3, to the driving reins of the harness on the animals to be controlled and which are indicated at 4, Fig. I.

5 are supplemental driving reins which extend from the driving reins 4 to the vehicle and which may be suspended in the vehicle when my device is in service.

6 designates a guide box mounted upon the body of the vehicle immediately above the hollow king-bolt F and through which the detention member 1 extends.

7 is a suspended gripping dog that extends vertically into the guide box 6 adjacent to the detention member 1 and which is preferably provided with upwardly projecting teeth or serrations 8 adapted to become embedded in the detention member when the gripping dog is moved thereagainst.

9 designates a lift arm that is suitably secured to the brake operating shaft H at the inner end of said shaft. This arm is, when the brakes of the vehicle are not applied, through the instrumentality of said brake operating shaft, located beneath the gripping dog 7, as indicated by dotted lines, Fig. III, whereby said gripping dog is normally maintained in the elevated position shown in dotted lines, and out of engagement with the detention member 1. When, however, the brake operating shaft is rotated by the forward movement of the end lever J the lift arm 9 is moved forwardly into the position shown in full lines, Figs. I, to III inclusive, whereby it is separated from the gripping dog and said dog is permitted to fall by gravity in the guide box 6 and into gripping engagement with the detention member 1 to prevent downward and forward movement of said detention member.

The operation of my device is as follows: When the device is not in service, the lift arm 9 upon the brake operating shaft acts to hold the gripping dog 7 in an elevated position and the detention member 1 is therefore at such time free of restraint so that it does not perform any function in connection with the driving reins of the harness on the animals attached to the vehicle. When the driver of the vehicle brings the draft animals to rest and desires to place my device in service, he causes the draft animals to move backwardly after they have come to a standstill, thereby producing slack in the traces by which they are hitched to the vehicle. After this slack has been produced, the driver exerts a pull upon the upper and rear end of the detention member 1 to draw it upwardly through the guide box 6 and approximately eliminates slack in said detention member, the driving reins and the connection between said detention member and reins. The driver then grasps the hand lever of the brake operating shaft and by throwing this lever forwardly, causes it to rotate the brake operating shaft so that the lift arm 9 thereon will be withdrawn from its previous position beneath the gripping dog 7. The gripping dog is thereby freed to permit its descent and it falls by gravity into gripping engagement with the detention member 1 within the guide box 6.

It will be apparent that inasmuch as slack has been caused to be present in the traces of the harness by which the draft animals are attached to the vehicle and slack is approximately eliminated from the detention member 1 and the driving reins, the draft animals will, upon any attempt made by them to move forwardly, be held in restraint consequent to the action of my detaining means upon the driving reins that are, as usual, connected to the bits of the bridles upon the animals. The animals obviously will not draw the vehicle by said bits and the device operates to detain them as desired. When my detaining device is to be released to free the draft animals of restraint, it is only necessary to release the brakes of the vehicle by rotation of the brake operating shaft H and when this is done, the lift arm 9 moves into a position beneath the gripping dog 7 to elevate it and free the detention member 1. Said detention member may then be drawn forwardly by the draft animals as they begin to draw the vehicle, whereby slack is produced in the member and the animals are freed from restraint by the device.

In some instances it is desirable to control the gripping dog 7 independent of the brake mechanism of the vehicle and I therefore provide a foot lever 10 that is pivotally mounted in the guide box 6 at 11 and pivoted at 12 to the gripping dog 7. This lever is adapted to be depressed at its forward end by the operator's foot to elevate the gripping dog when necessary in order that the detention member 1 may be slackened. When the lever 10 is freed of restraint, the gripping dog will descend by gravity to perform its function of holding the detention member 1 in the manner before explained.

I claim:

1. In a device of the character described, the combination with a vehicle, of a hollow king-bolt, a detention member loosely mounted in said vehicle, passed through the hollow king-bolt, and arranged for connection to the bridle of a draft animal, a guide box through which said detention member passes, and a dog loosely mounted in said guide box and adapted to engage said detention member to hold it from movement, substantially as set forth.

2. In a device of the character described, the combination with a vehicle, and a brake operating member carried thereby, of a hollow king-bolt, a detention member carried by said vehicle, passed through the hollow king-bolt, and arranged for connection to the bridle of a draft animal, means for engaging and holding said detention member, and means operable by said brake operating member for actuating said detention member engaging means, substantially as set forth.

3. In a device of the character described, the combination with a vehicle and a brake operating member carried by said vehicle, of a detention member carried by said vehicle and arranged for connection to the bridle of a draft animal, a dog for engagement with said detention member to hold it from movement, and an arm carried by said brake operating member for moving said dog out of engagement with said detention member, substantially as set forth.

CHAS. REIGER.

In presence of—
  E. M. HARRINGTON,
  E. B. LINN.